United States Patent [19]
Day et al.

[11] Patent Number: 5,953,526
[45] Date of Patent: Sep. 14, 1999

[54] OBJECT ORIENTED PROGRAMMING SYSTEM WITH DISPLAYABLE NATURAL LANGUAGE DOCUMENTATION THROUGH DUAL TRANSLATION OF PROGRAM SOURCE CODE

[75] Inventors: Don Rutledge Day; Otis Otto Fox, both of Austin, Tex.

[73] Assignee: Internatinal Business Machines Corp., Armonk, N.Y.

[21] Appl. No.: 08/967,653

[22] Filed: Nov. 10, 1997

[51] Int. Cl.⁶ ........................................ G06F 9/45
[52] U.S. Cl. .................... 395/701; 395/704; 395/710; 395/712
[58] Field of Search ............................ 364/138; 395/701, 395/500, 700, 704, 683, 710, 712; 707/10; 434/350

[56] References Cited

U.S. PATENT DOCUMENTS

| | | | |
|---|---|---|---|
| 5,355,472 | 10/1994 | Lewis | 395/600 |
| 5,404,525 | 4/1995 | Endicott et al. | 395/702 |
| 5,530,852 | 6/1996 | Meske, Jr. et al. | 395/600 |
| 5,652,888 | 7/1997 | Burgess | 395/683 |
| 5,659,729 | 8/1997 | Nielsen | 707/3 |
| 5,727,950 | 3/1998 | Cook et al. | 434/350 |
| 5,764,989 | 6/1998 | Gustafsson et al. | 395/704 |
| 5,768,564 | 6/1998 | Andrews et al. | 395/500 |
| 5,778,368 | 7/1998 | Hogan et al. | 707/10 |
| 5,778,378 | 7/1998 | Rubin | 707/103 |
| 5,805,442 | 9/1998 | Crater et al. | 364/138 |
| 5,809,145 | 9/1998 | Slik et al. | 380/25 |
| 5,815,718 | 9/1998 | Tock | 395/705 |
| 5,826,267 | 10/1998 | McMillan | 707/9 |

OTHER PUBLICATIONS

Baker et al., "A new model for algorithm animation over the WWW", ACM Computing Survey. vol. 27, No. 4, pp. 568–572, Dec. 1995.

Klabunde et al., "Developing object oriented user interface in Ada with the X window system", ACM pp. 300–308, Jan. 1992.

Helm et al., "Integrating information retrieval & domain specific approaches for browsing & retrieval in object oriented class libraries", OOPSLA ACM, pp. 47–61, May 1991.

Ball & Love, "The key to object oriented simulation: Separating the user and the developer", Proc. 1995 Winter Simulation Conference, pp. 768–774.

*Primary Examiner*—Tariq R. Hafiz
*Assistant Examiner*—Anil Khatri
*Attorney, Agent, or Firm*—Jerry B. Kraft; David A. Mims, Jr.

[57] ABSTRACT

A computer controlled object oriented programming system for interfacing a plurality of programming objects with each other to provide combination objects combining programming functions of the objects, each object including predetermined interface data defining a required common interface with the other programming objects in a framework of events, attributes and methods for manipulating the attributes. These objects may be combined with each other via their common interfaces to form combination objects and such combination objects may in turn be further combined with other objects and combination objects to form objects of increasing complexity which function as complete programs. There is provided a displayable output of documentation for the programming objects in which the basic documentation provided for an object oriented program by its developers may be added to or modified without the need to change the framework of the objects in the program. To accomplish this, the invention involves the combination of two documentation functions: 1) the basic documentation program which translates source code data within the object framework, and 2) an implementation translating a portion of the object source code data which is outside of the object framework.

19 Claims, 4 Drawing Sheets

OBJECT ORIENTED PROGRAMMING SYSTEM WITH DISPLAYABLE NATURAL LANGUAGE DOCUMENTATION THROUGH DUAL TRANSLATION OF PROGRAM SOURCE CODE

TECHNICAL FIELD

The present invention relates to user-interactive object oriented programming systems and particularly to such object oriented programming systems which would be available to both programmers and interactive users in a networking environment such as the internet or equivalent proprietary or public networks.

BACKGROUND OF THE INVENTION

The 1990's decade has been marked by a societal technological revolution driven by the convergence of the data processing industry with the consumer electronics industry. Like all such revolutions, it unleashed a great ripple effect of technological waves. The effect has in turn driven technologies which have been known and available but relatively quiescent over the years. Two of these technologies are the internet-related distribution and object oriented programming systems. Both of these technologies are embodied in the object oriented Java Programming system. The computer and communications industries have been extensively participating in the development and continual upgrading of the Java system. For details and background with respect to the Java system, reference may be made to a typical text, "Just Java", 2nd Edition, Peter van der Linden, Sun Microsystems, Inc., 1997. The convergence of the electronic entertainment and consumer industries with data processing exponentially accelerated the demand for World Wide Web or internet which had quietly existed for over a generation as a loose academic and government data distribution facility reached "critical mass" and commenced a period of phenomenal expansion which has not as yet abated.

With the expanded accessibility of tens of thousands of programmers to each other, not to mention to potential users of such programs via the expanded internet client base, an obvious need became apparent: cooperative programming systems wherein program developers could coact to continuously expand and enhance existing programs in a distributed programming environment. Also, users could readily obtain and apply these developed programs. Object oriented programming, which had also been virtually languishing for a generation, offered the solution. With its potentially interchangeable objects or units within which both data attributes and functions were stored in a predefined uniform framework, as well as the predefined object interfaces with each other, object oriented programming systems have found acceptance as the programming system for the internet. In all areas of data processing and communications, as well as the electronic entertainment and consumer industries having anything to do with the internet, there has been a substantial movement to Java, the Sun Microsystems, Inc.'s originated object oriented programming system.

While the above described advantages of object oriented programming with respect to collective and cooperative programming are clear, new needs have arisen in these programming systems where literally thousands of program developers and users are continually upgrading and changing the programs. There is a need for programmers and users readily being able to display program documentation in a clear and comprehensive manner in natural language. To this end, the developers of Java Programming have come up with JavaDoc, a documentation generator. JavaDoc generates its documentation with an API (Application Programming Interface) which requires programming objects having common framework structures which include data attributes, methods of manipulating such attributes and data defining predetermined common interfaces between objects. With programming systems based on such objects, JavaDoc will provide standard HTML (Hypertext Markup Language) outputs to computer controlled displays to provide standard natural language displays of the program documentation. HTML has become the display language of choice for the internet or World Wide Web. It is used there for all forms of display documentation including the markup of hypertext and hypermedia documents, usually stored with their respective documents on an internet or web server. HTML is an application of SGML (Standard Generalized Markup Language), an ISO standard for defining the structure and contents of any digital document. It should be recognized that any of the aspects of the present invention illustrated with respect to HTML would be equally applicable to SGML. For further details on Java, JavaDoc or HTML, reference may be made to the above mentioned "Just Java" text or to the text, "Java in a Nutshell", 2nd Edition, by David Flanagan, O'Reilly publisher, 1997. One limitation with the use of the JavaDoc document generator is that what will be included in the documentation is usually predetermined since all data to be used to provide documentation must be structured in the previously described API format. Thus, if others down the line from the prior developers believe that it would be advantageous to include additional comments, annotations or even active messages, the prior Java programming objects would have to be modified to include doc comments within the API framework. This may at times be awkward and inefficient. The present invention provides an alternative approach to enhancing the documentation without modifying existing Java objects.

SUMMARY OF THE INVENTION

The present invention relates to a computer controlled object oriented programming system having means for interfacing a plurality of programming objects with each other to provide combination objects combining programming functions of said objects in which each object includes predetermined interface data defining a required common interface with the other programming objects. A plurality of these objects, each having a framework comprising a plurality of data attributes and a method of manipulating said data attributes. These objects may be combined with each other via their common interfaces to form combination objects and such combination objects may in turn be further combined with other objects and combination objects to form objects of increasing complexity which function as object oriented programs.

The invention involves a documentation system for providing a displayable output of documentation for said programming objects in which the basic documentation provided for an object oriented program by its developers may be added to or modified without the need to change the framework of the objects in the program. To accomplish this, the invention involves the combination of two documentation means: 1) the basic documentation program object provided by the program developers which has the basic interface data defining said required common interface with means for storing said source code and means for translating a first portion of said source code (i.e., the portion selected by the developers for documentation) into an output in a language readable by a computer controlled display system to display said first portion of said source code in natural language documentation; and 2) means without said interface data defining said required common interface for translating a selected second portion of said source code (i.e., a portion not chosen for documentation by the original program developers) into an output in the same language as said language readable by said computer controlled display to display said second portion of said source code in the same natural language documentation complementing the documentation of said first portion.

In accordance with a preferred aspect of the invention, the system further includes means for obtaining from said source code identifiers for selecting said second portion of said source code. These identifiers are used to select this second portion from the machine code which the source code is compiled into.

DETAILED DESCRIPTION OF THE PREFERRED EMBODIMENT

Figure 1:
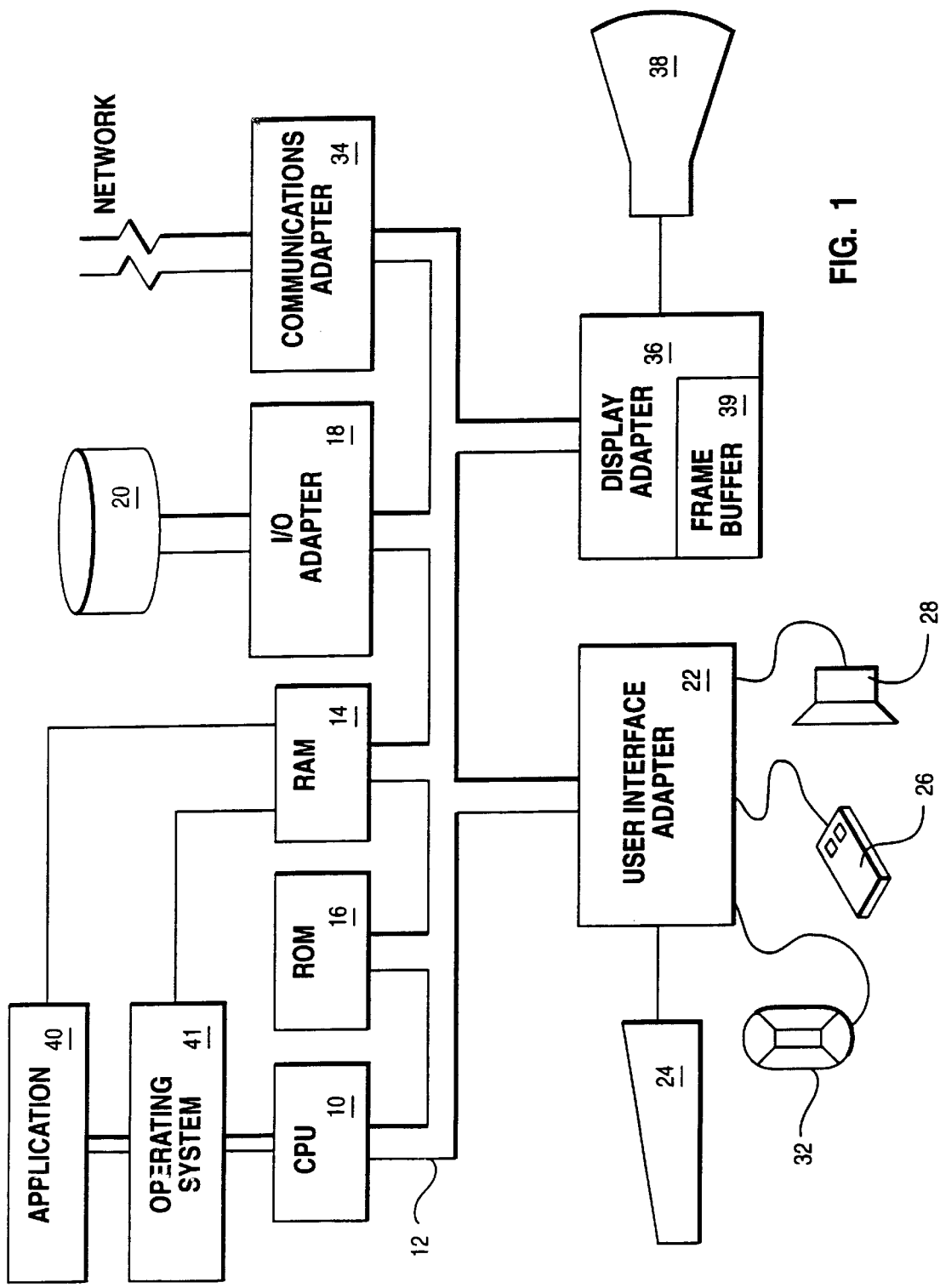
FIG. 1 is a block diagram of a data processing system including a central processing unit and network connections via a communications adapter which is capable of implementing the present invention.

Before going into the details of specific embodiments, it will be helpful to understand from a more general perspective the various elements and methods which may be used to implement the present invention. The present invention is implemented using the Java Programming system which is an object oriented system utilizing the Java programming language. The Java system and language are extensively familiar to those skilled in the art. The text, "Just Java", Peter van der Linden, described above comprehensively details the system and language. Nonetheless, it should be helpful to generally review the known principles of object oriented programming.

It should be understood by those skilled in the art that object oriented programming techniques involve the definition, creation, use and instruction of "objects". These objects are software entities comprising data elements or attributes and methods, which manipulate the data elements. Objects may also include data related to events outside of the object to trigger or control methods within the object. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques: encapsulation, polymorphism and inheritance. Objects can be designed to hide, or encapsulate, all or a portion of the internal data structure and the internal functions. More particularly during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and prevents the program from being run.

Polymorphism allows objects and functions which have the same overall format but which work with different data to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse preexisting programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no preexisting software programs are available for modification. Consequently, a set of predefined interconnected classes are sometimes provided to create a set of objects and additional miscellaneous routines which are all directed to performing commonly encountered tasks in a particular environment. Such predefined classes are typically called "frameworks" and essentially provide a prefabricated structure as a basis for creating a working application program.

In object oriented programming, such as the previously described Java system, there is provided for the developer a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise. A clarification of the term "framework" as used in object oriented programming is in order. Frameworks are predefined structures for objects, combinations of objects which form more extensive objects and eventually combinations which provide whole programs. Conventionally, with the Java object oriented programs the content of the documentation of the program is determined by what is included in the program framework and has its required interface characteristics, i.e. API. Even annotations must meet such criteria to be included as "Doc Comments" in the program documentation. As set forth above, the present invention provides a secondary documentation route to be used in combination with the basic "JavaDoc" documentation for the program.

Referring to FIG. 1, a typical data processing system is shown which may be used in conjunction with object oriented software such as Java (TM of Sun Microsystems, Inc.) in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS or the OS/2 operating system available from International Business Machines Corporation (OS/2 is a trademark of International Business Machines Corporation). An object oriented programming system, such as Java 40, runs in conjunction with operating system 41 and provides output calls to the operating system 41 which implements the various functions to be performed by the application 40. The Java Programming System in combination with the operating system provides the basic platform with which software developers will develop and end users will use the object oriented software involved in this invention.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the Java application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) which includes, of course, the internet for which Java was created. I/O devices are also connected to system bus 12 via user interface adapter 22 and display adapter 36. Keyboard 24, trackball 32 and mouse 26 are all interconnected to bus 12 through user interface adapter 22. Event data may be input to the object oriented programming system through any of these devices. Display adapter 36 includes a frame buffer 39 which is a storage device that holds a representation of each pixel on the display screen 38. Images may be stored in frame buffer 39 for display on monitor 38 through various component such as a digital to analog converter (not shown) and the like. By using the aforementioned I/O devices, a user is capable of inputting event data and other information to the system through the keyboard 24, trackball 32 or mouse 26 and receiving output information from the system via display 38.

Since the present invention is implemented in the Java object oriented programming system, some initial comments concerning object oriented programming principles as embodied in Java are be appropriate. Since object oriented programming systems have been rapidly developing in recent years, including systems and languages other than Java, there is still an absence of universality in the terminology which is being used in the art to describe various object oriented programming functions. It will be understood by those skilled in the art that other terms may have been used to describe the principles which we will discuss herein. As set forth in the above-mentioned references, Java is a fully object oriented programming system which operates on a basic operating system such as Windows or OS/2. Java includes a wealth of frameworks, class libraries and a new programming environment intended to greatly enhance application software development on the internet. It is intended to be fully portable between operating systems. There is a defined commonality between users factored into a set of services and frameworks. In Java, as in all highly sophisticated object oriented systems, writing an application program means creating a set of linked objects integrated into the Java operating system platform. Software developers rely on this platform for both a sophisticated set of services and a framework to develop software. The frameworks provide powerful abstractions which permit software developers to concentrate on their problem rather that building up infrastructure. Furthermore, the abstractions for the software developer are very close to the fundamental concepts that a user must understand to operate his software. All this makes the development of applications easier.

An embodiment of the present invention will be described which uses the Java APIS. Let us consider the problem which led to this invention. JavaDoc, which is described in additional detail on pp. 253 to 256 of the above referenced "Java in a Nutshell" text, is the Java documentation generator. It generates API documentation in HTML format for a specified Java package for specified individual Java source files (.java files). It parses the source files, reads them and generates HTML documentation files that describe each public class defined in the source files. The generated file is a result of parsing the "doc comments" that are associated with the class, and with its methods, constructors and attributes and other variables. These "doc comments" must, of course, have a defined format in order to be included in the generated documentation. For example, the comment must begin with "/**" and end with "*" Thus, it is only those annotations and text which the Java program developer has so specified which end up in the documentation. Traditionally, messages and code were maintained separately with the consequent problems of maintaining and consistency. For that reason, it was necessary to derive documentation from a single source maintaining both the documentation and the code. Conventionally, this would require a reworking of the program so that it would provide a format for the additional information so as to include it in generated HTML documentation. AS will be described in detail with respect to the preferred embodiment, the secondary route approach of this invention avoids such a reworking by providing an isomorphic view of both data types.

Figure 2:
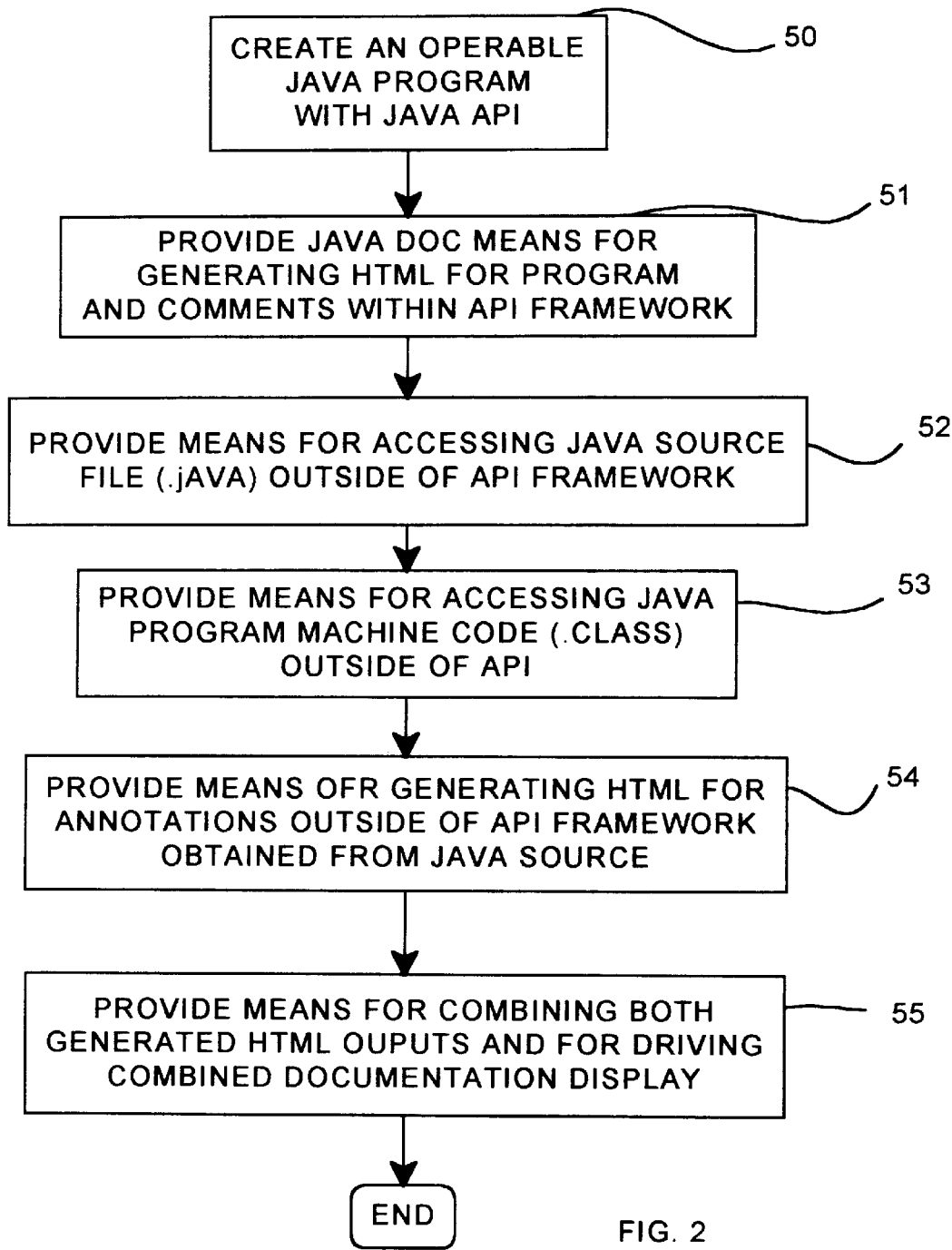
FIG. 2 is a flowchart describing the steps involved in developing the system of the present invention using combined documentation generating means.

The present invention will now be described with respect to the flowcharts of FIGS. 2 through 4. In the example of the invention embodiment, Java language, code and principles will be used. These are fully described in the previously referenced text, "Java in a Nutshell", David Flanagan. FIG. 2 is a chart showing the development of the system of the present invention using combined dual documentation generating means. Step 50, using Java programming techniques, a Java program object with an API framework is created. Step 51, standard JavaDoc program documentation generating means are provided to handle the program as well as standard "doc comments" within the API framework to provide an HTML output. Means are provided for accessing the Java source file (.java) from outside of the API framework, step 52. Also, means are provided for accessing the Java program machine code (.Class) from outside of the API framework, step 53. Because the stream is not specifically in HTML format, orthogonality is preserved for subsequent transformation to other formats. XML may be derived in step 54 from the data stream 53. Then the system provides means for combining the HTML output from step 51 with the HTML output from step 54 to drive a display of the combined documentation, step 55.

Now, with respect to FIG. 3, there will be described how a particular example of data relative to a Java Program, some of which data is within the Java API framework and some of which is not, would be handled by the present invention. Let us assume that the Java Program source file, .java, 56 contains program comments having the requisite API "doc comments" format in addition to the contents of the program proper which, of course, have the API format. Also included in the source code are "messages" which are the messages the program gives the user during the running of the program. These messages are not part of the JavaDoc API and are consequently not in the required Java API format. However, in the present example, it is necessary to also include messages in the documentation. In any event, step 57, the JavaDoc program generates the HTML for the conventional program objects including the comments, step 58 which are in the API format. This output will be combined with a structured output representative of messages (to be subsequently described) to provide a combined HTML output, step 64 which will, step 60, control a natural language display on a computer controlled display terminal 61. It should be noted that the system also generates a machine code, class, step 62, which will be used to control the computer on which the Java program is being run. Since "messages" will be displayed during the running of the Java program on the computer, step 63, the "messages" are included in the machine code, claps.

Considering now how the nonAPI data, e.g. messages are handled to provide their documentation, step 66, the system goes to the source code to find the message identifier, step 67, after which it uses the identifier to locate the message in the class machine code, step 68. The reason that the message is taken from the machine code rather than from the source code is that the message content can be queried from the machine code using the object methods thereby obviating the difficult problem of parsing data from the source code. The comment data is not part of the compiled byte stream (.class file). On the other hand, in the machine code related to the messages, comment data is not available. Thus, the process must first go to the source code to locate the comment data associated with the identifiers. The message is then translated into an isomorphic tagged format using JavaDoc conventions after which HTML or any other desired display format may be generated. In the flowchart of FIG. 3, this is generalized as two steps: the creation of a semantically classed data stream, step 69. The creation of this semantically classed data stream will be described in detail subsequently with respect to FIG. 4. In any event, step 64, the output of step 69 is combined with the output of step 58 into a combined HTML which as previously described controls combined display 61 to complete the documentation in natural language on the display.

While the end use in this embodiment was for display, it should be understood that it would be equally applicable for storage at data exchange facilities.

Figure 3:
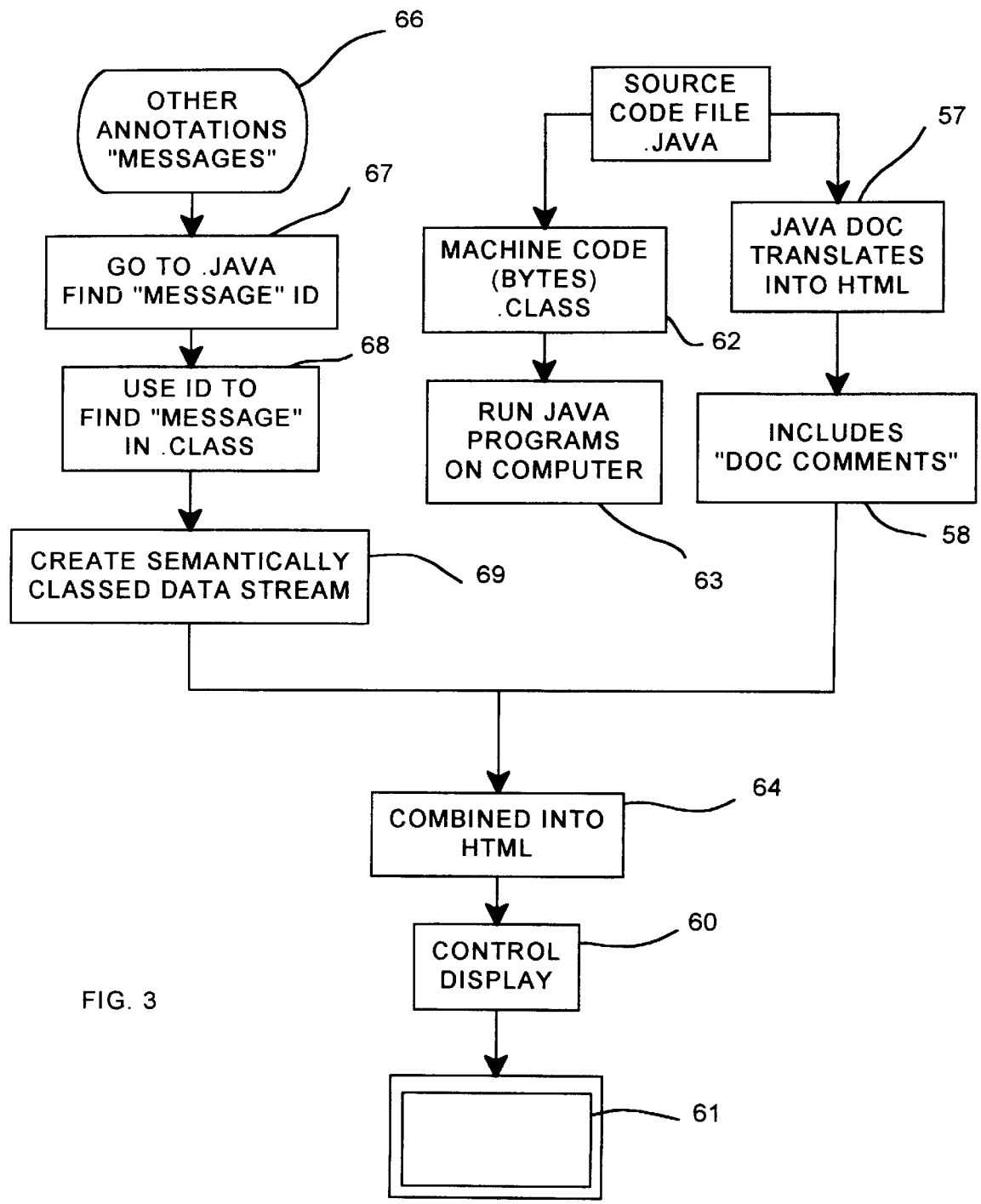
FIG. 3 is a flowchart describing general system operations in which means for generating documentation for data outside of the Java API framework is combined with Java-Doc means for generating documentation for API data to produce a combined HTML output.
Figure 4:
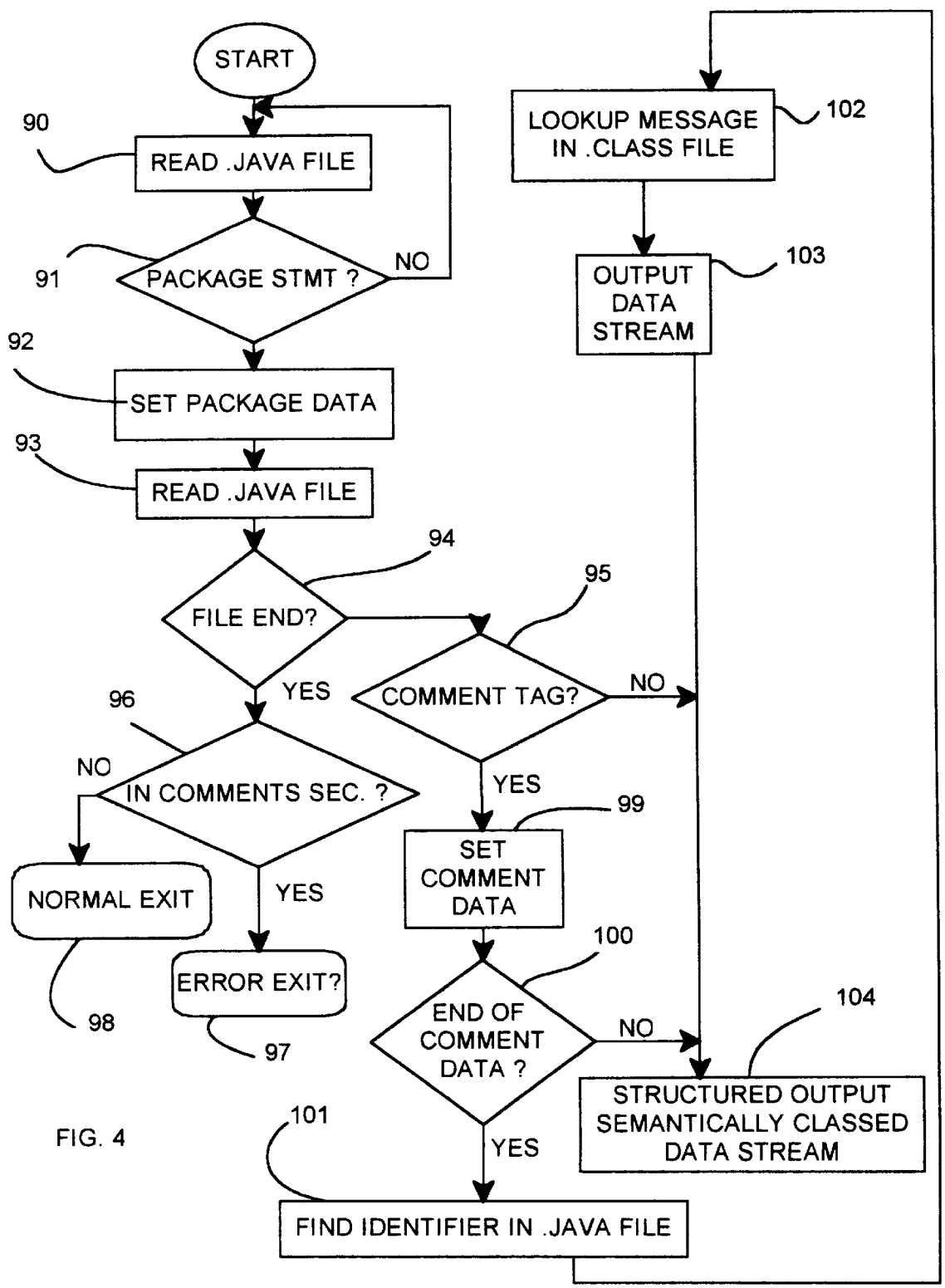
FIG. 4 is a flowchart describing how step 69 of FIG. 3 may be carried out using JavaDoc conventions.

We have previously described with respect to FIG. 3, steps 69 and 64 how the specific JavaDoc process creates semantically classed data streams which are then combined into the HTML which will support the display. In FIG. 4, we will describe a flow detailing this process. The purpose of a message parser is to scan through a Java resource bundle (.java file) and produce a tagged output stream. The structure of a Java file requires the package statement to be the first executable line in the file. Thus, step 90 reads the .java file to look for the package statement. Step 91 is the test for this statement. Comments may precede the package statement, so it is necessary to loop until the package statement is found. Once found, the package statement is parsed and the package name is put into a data structure, step 92, that will be used to generate the output stream, step 93. After finding the package statement, the message parser searches for the first comment tag (that is, the "/" token) in steps 93 and 95. If the end of the file is reached, step 94, the process terminates, step 98. An error is reported if the end of the .java file is reached before the comment section is closed, steps 96 and 97. When a comment section is found, the various tags are parsed, step 99. This parsing continues until the end of the comment is found, step 100** (this is denoted by the "*/" token). Immediately after the comment closing token, the parser looks for a Java string which it uses as an identifier, step 101. This identifier is used to reference the class file to get the message associated with the comment data, step 102. (Step 102 corresponds to step 53 in FIG. 2. All other processing of the .java file in steps 90 through 101 correspond to step 52 in FIG. 2.) Step 103 outputs a tagged stream, in JavaDoc style syntax which provides the structured output, step 104 i.e., the semantically classed data stream of step 69, FIG. 3 which will be combined into the HTML to drive the display.

Although certain preferred embodiments have been shown and described, it will be understood that many changes and modifications may be made therein without departing from the scope and intent of the appended claims.

We claim:

1. In a computer controlled object oriented programming system having means for interfacing a plurality of programming objects wherein said programming objects may be initial programming objects and combinations of such initial programming objects combining functions of said initial objects, and each programming object respectively having a framework including data attributes, methods of manipulating such attributes and predetermined interface data defining a required common interface with the other programming objects, a system for providing a displayable output of documentation for said programming objects comprising:

means for storing the source code of at least one of said programming objects, a documentation programming object having said interface data defining said required common interface and means for translating a first portion of said source code into an output in a language readable by a computer controlled display system to display said first portion of said source code in natural language documentation, and means without said interface data defining said required common interface for translating a selected second portion of said source code into an output in the same language as said language readable by said computer controlled display to display said second portion of said source code in the same natural language documentation complementing the documentation of said first portion.

2. The computer controlled object oriented programming system of claim 1, further including means for obtaining from said source code identifiers for selecting said second portion of said source code.

3. The computer controlled object oriented programming system of claim 2, further including:

means for compiling machine code for driving said computer from at least part of said source code, and means for applying said identifiers to select said second portion of said source from said machine code compiled from said part of said source code.

4. The computer controlled object oriented programming system of claim 1 wherein:

said object oriented programming system is the Java Programming System, said documentation programming object is JavaDoc, and said language readable by said computer controlled system is HTML.

5. The method of claim 1, further including the step of obtaining from said source code, identifiers for selecting said second portion of said source code.

6. The method of claim 5, further including the steps of compiling machine code for driving said computer from at least part of said source code, and applying said identifiers to select said second portion of said source from said machine code compiled from said part of said source code.

7. In a computer implemented method of object oriented programming including interfacing a plurality of programming objects wherein said programming objects may be initial programming objects and combinations of such initial programming objects combining functions of said initial objects, and each programming object respectively having a framework including data attributes, methods of manipulating such attributes and predetermined interface data defining a required common interface with the other programming objects, a method for providing a displayable output of documentation for said programming objects comprising:

storing the source code of at least one of said programming objects, translating via said required common interface, a first portion of said source code into an output in a language readable by a computer controlled display system to display said first portion of said source code in natural language documentation, and translating independently of said required common interface a selected second portion of said source code into an output in the same language as said language readable by said computer controlled display to display said second portion of said source code in the same natural language documentation complementing the documentation of said first portion.

8. The method of claim 7 wherein:

said object oriented programming system is the Java Programming System, said documentation programming object is JavaDoc, and said language readable by said computer controlled system is HTML.

9. In a computer program having data structures included on a computer readable medium comprising an object oriented programming system having means for interfacing a plurality of programming objects wherein said programming objects may be initial programming objects and combinations of such initial programming objects combining functions of said initial objects, and each programming object respectively having a framework including data attributes, methods of manipulating such attributes and predetermined interface data defining a required common interface with the other programming objects, a system for providing a displayable output of documentation for said programming objects comprising:

means for storing the source code of at least one of said programming objects, a documentation programming object having said interface data defining said required common interface and means for translating a first portion of said source code into an output in a language readable by a computer controlled display system to display said first portion of said source code in natural language documentation, and means without said interface data defining said required common interface for translating a selected second portion of said source code into an output in the same language as said language readable by said computer controlled display to display said second portion of said source code in the same natural language documentation complementing the documentation of said first portion.

10. The computer program according to claim 9, further including means for obtaining from said source code identifiers for selecting said second portion of said source code.

11. The computer program according to claim 10, further including:

means for compiling machine code for driving said computer from at least part of said source code, and means for applying said identifiers to select said second portion of said source from said machine code compiled from said part of said source code.

12. In a computer controlled object oriented programming system having means for interfacing a plurality of programming objects wherein said programming objects may be initial programming objects and combinations of such initial programming objects combining functions of said initial objects, and each programming object respectively having a framework including data attributes, methods of manipulating such attributes and predetermined interface data defining a required common interface with the other programming objects, a system for providing a displayable output of documentation for said programming objects comprising:

means for storing the source code of at least one of said programming objects, means for compiling machine code for driving said computer from at least part of said source code, a documentation programming object having said interface data defining said required common interface and means for translating a first portion of said source code into an output in a language readable by a computer controlled display system to display said first portion of said source code in natural language documentation including comments directly related to functions within said framework of said one programming object, means without said interface data defining said required common interface for translating a selected second portion of said source code into an output in the same language as said language readable by said computer controlled display to display said second portion of said source code in the same natural language documentation including data not directly related to said functions to complement the documentation of said first portion, means for obtaining from said source code, identifiers for selecting said second portion of said source code, and means for applying said identifiers to select said second portion of said source code from said compiled machine code.

13. The computer controlled object oriented programming system of claim 12, wherein said displayed second portion includes message data displayed during the running of said computer.

14. The computer controlled object oriented programming system of claim 13 wherein:

said object oriented programming system is the Java Programming System, said documentation programming object is JavaDoc, said language readable by said computer controlled system is HTML, said source code is .java, said machine code is .Class, and said comments are handled as doc comments by JavaDoc.

15. In a computer implemented method of object oriented programming including interfacing a plurality of programming objects wherein said programming objects may be initial programming objects and combinations of such initial programming objects combining functions of said initial objects, and each programming object respectively having a framework including data attributes, methods of manipulating such attributes and predetermined interface data defining a required common interface with the other programming objects, a method for providing a displayable output of documentation for said programming objects comprising:

storing the source code of at least one of said programming objects, compiling machine code for driving said computer from at least part of said source code, translating via said required common interface, a first portion of said source code into an output in a language readable by a computer controlled display system to display said first portion of said source code in natural language documentation including comments directly related to functions within said framework of said one programming object, translating independently of said required common interface a selected second portion of said source code into an output in the same language as said language readable by said computer controlled display to display said second portion of said source code in the same natural language documentation including data not directly related to said functions to complement the documentation of said first portion, obtaining from said source code, identifiers for selecting said second portion of said source code, and applying said identifiers to select said second portion of said source code from said compiled machine code.

16. The method of claim 15, wherein said displayed second portion includes message data displayed during the running of said computer.

17. The method of claim 16 wherein:

said object oriented programming system is the Java Programming System, said documentation programming object is JavaDoc, said language readable by said computer controlled system is HTML, said source code is .Java, said machine code is .Class, and said comments are handled as doc comments by JavaDoc.

18. In a computer program having data structures included on a computer readable medium comprising an object oriented programming system having means for interfacing a plurality of programming objects wherein said programming objects may be initial programming objects and combinations of such initial programming objects combining functions of said initial objects, and each programming object respectively having a framework including data attributes, methods of manipulating such attributes and predetermined interface data defining a required common interface with the other programming objects, a system for providing a displayable output of documentation for said programming objects comprising:

means for storing the source code of at least one of said programming objects, means for compiling machine code for driving said computer from at least part of said source code, a documentation programming object having said interface data defining said required common interface and means for translating a first portion of said source code into an output in a language readable by a computer controlled display system to display said first portion of said source code in natural language documentation including comments directly related to functions within said framework of said one programming object, means without said interface data defining said required common interface for translating a selected second portion of said source code into an output in the same language as said language readable by said computer controlled display to display said second portion of said source code in the same natural language documentation including data not directly related to said functions to complement the documentation of said first portion, means for obtaining from said source code, identifiers for selecting said second portion of said source code, and means for applying said identifiers to select said second portion of said source code from said compiled machine code.

19. The computer program according to claim 18, wherein said displayed second portion includes message data displayed during the running of said computer.

* * * * *